US008205023B1

(12) United States Patent
Rhoades

(10) Patent No.: US 8,205,023 B1
(45) Date of Patent: Jun. 19, 2012

(54) CONCURRENT PAIRING OF RESOURCES AND REQUESTORS

(75) Inventor: Robert Rhoades, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/894,563

(22) Filed: Sep. 30, 2010

(51) Int. Cl.
  G06F 3/00 (2006.01)
  G06F 17/00 (2006.01)
(52) U.S. Cl. .......................................... 710/43; 726/21
(58) Field of Classification Search .................... 710/43; 726/21
  See application file for complete search history.

(56) References Cited

U.S. PATENT DOCUMENTS

| 3,913,070 A * | 10/1975 | Malcolm et al. ............... 718/104 |
| 2007/0294681 A1* | 12/2007 | Tuck et al. .................... 717/149 |
| 2008/0162735 A1* | 7/2008 | Voigt et al. ....................... 710/6 |
| 2009/0119773 A1* | 5/2009 | D'Amore et al. ................ 726/21 |

* cited by examiner

Primary Examiner — Hyun Nam
(74) Attorney, Agent, or Firm — Harrity & Harrity, LLP

(57) ABSTRACT

A device includes a group of resources, where each resource is to determine a priority rank position, among the group of resources, based on which other resources of the group of resources are available. The device also includes a group of requestors of the resources, where each requestor is to determine a priority rank position, among the group of requestors, based on which other requestors are active and based on each active requestor's priority. The device also includes a processing component to receive the priority rank position from each resource and the priority rank position from each requestor; assign pairs of the resources and the requestors based on the priority rank position of each resource and the priority rank position of each requestor; and assign work to resources of the group of resources based on the pairs.

18 Claims, 7 Drawing Sheets

CONCURRENT PAIRING OF RESOURCES AND REQUESTORS

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic. Packets may be temporarily stored in queues as packets are moved through the network devices.

Processing modules within a network device may process packets based on sets of instructions. The instructions for each packet may be executed by one of multiple resources, such as processes or execution threads. In systems with fungible resources, efficiently pairing work items (e.g., packets, notifications, packet pointers, etc. from queues) with available resources (e.g., threads or other processing components) can present a challenge.

When multiple requestors desire the same resource, an arbitration circuit is required. When there are multiple resources available, it is necessary to perform multiple arbitrations. Performing multiple arbitrations typically involves a sequential, iterative solution, in which, for each iteration, the winning requestor/resource pair is removed, and a follow-on arbitration is performed to select the next requestor/resource pair. This sequence is repeated N times (where N is the number of resources available), until all available resources are paired with a work item.

SUMMARY

According to one aspect, a method may be performed by a device that includes a group of resources and a group of requestors of the resources. The method may include determining, by each available resource of the group of resources, a priority rank position of each resource, among the available resources, based on which other resources are available and based on each available resource's priority; and determining, by each active requestor of the group of requestors, a priority rank position of each requestor, among the active requestors, based on which other requestors are active and based on each active requestor's priority. The method may also include receiving, by an arbiter of the device, the priority rank position of each resource and the priority rank position of each requestor; assigning, by the arbiter, one or more pairs of the available resources and the active requestors based on the priority rank position of the resources and the priority rank position of the requestors; and assigning work to the available resources based on the one or more pairs.

According to another aspect, a device may include a group of resources, a group of requestors of the resources, and a processing component. Each resource may determine a priority rank position, among the group of resources, based on which other resources of the group of resources are available. Each requestor may to determine a priority rank position, among the group of requestors, based on which other requestors are active and based on each active requestor's priority. The processing component may receive the priority rank position of each resource of the group of resources and the priority rank position of each requestor of the group of requestors; assign pairs of the resources and the requestors based on the priority rank position of each resource and the priority rank position of each requestor; and assign work to resources of the group of resources based on the pairs.

According to still another aspect, a method may include receiving, by a resource of a group of processing resources, a resource priority indication; receiving, by the resource, an availability indication of other available resources, in the group of processing resources, that have a higher priority than that of the resource priority indication; and determining, by the resource, a priority rank position of the resource, among the other available resources, based on the resource priority indication and the availability indication. The method may also include receiving, by a requestor of a group of requestors for the processing resources, a requestor priority indication; receiving, by the requestor, an activity indication of other requestors, in the group of requestors, that have a requestor higher priority; and determining, by the requestor, a priority rank position for the requestor, among the other requestors, based on the requestor priority indication and the activity indication. The method may further include assigning, by an arbiter for the group of processing resources and the group of requestors, the resource and the requestor to a pairing, based on the priority rank position for the resource and the priority rank position for the requestor.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may match multiple available resources with multiple active requestors within a processing module. A pairing system may handle the pairing of multiple available resources with multiple active requestors (e.g., supplying work items) such that multiple arbitrations may be performed simultaneously within a clock cycle rather than sequentially. Resources may include, for example, processing threads, hardware components (e.g., gates, flops, etc.), or other resources that may be used to satisfy a request. A requestor may include a memory component, such a queue or buffer, or another component that provides items (e.g., packets, portions of packets, packet identifiers, notifications, etc.) upon which processing may be performed by an available resource. In implementations described herein, resources may be fungible in that any available resource may be paired with any active requestor.

In one implementation, a processing module may perform the pairing of multiple available resources with multiple active requestors as a two step process. In the first step, a ranking of each requestor may be determined, based on which requestors are active and based on a current priority for each requestor. This requestor ranking calculation may be performed regardless of the number of resources that are available at any given time. Simultaneously, resources may also be ranked based on their availability and their priority states, regardless of how many requestors are active. In the second step, the top requestors may be paired with the top resources (e.g., up to the total number of available resources), and access to these resources may be granted. Thus, multiple pairing may be performed in a single clock cycle.

The term "packet," as used herein, may refer to a packet, a datagram, or a cell; a fragment of a packet, a fragment of a datagram, a fragment of a cell; or another type, arrangement, or packaging of data.

Figure 1:
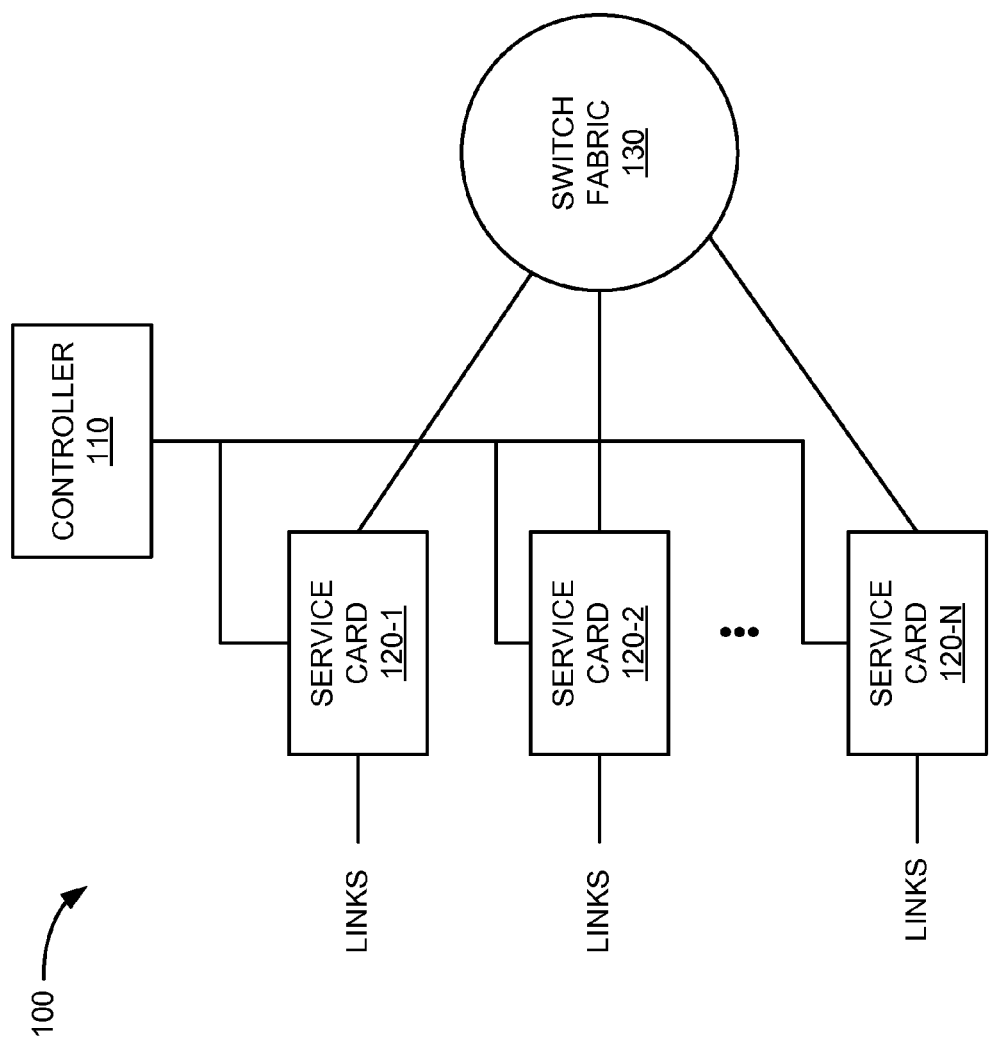
FIG. 1 is a diagram of an example network device in which systems and/or methods described herein may be implemented.

FIG. 1 is a diagram of an example network device 100 in which systems and/or methods described herein may be implemented. In this particular implementation, network device 100 may take the form of a router, although the systems and/or methods herein may be implemented in another type of network device. For example, network device 100 may include another data transfer device, such as a gateway, a switch, a firewall, a network interface card (NIC), a hub, a bridge, a proxy server, an optical add-drop multiplexer (OADM), or some other type of device that processes and/or transfers traffic. In other implementations, network device 100 may include a server, a personal computer, or another computing device.

Network device 100 may receive one or more packet streams from physical links, may process the packet stream(s) to determine destination information, and may transmit the packet stream(s) out on links in accordance with the destination information. Network device 100 may include a controller 110, service cards 120-1, 120-2, . . . , 120-N (referred to collectively as "service cards 120" and generically referred to as "service card 120"), and a switch fabric 130.

Controller 110 may perform high level management functions for network device 100. For example, controller 110 may maintain the connectivity and manage information/data necessary for transferring packets by network device 100. Controller 110 may create routing tables based on network topology information, create forwarding tables based on the routing tables, and communicate the forwarding tables to service cards 120. Service cards 120 may use the forwarding tables to perform route lookup for incoming packets and perform the forwarding functions for network device 100. Controller 110 may also perform other general control and monitoring functions for network device 100.

Each of service cards 120 may be connected to controller 110 and switch fabric 130. Service cards 120 may receive packet data on physical links connected to a network, such as a wide area network (WAN) or a local area network (LAN). Each physical link could be one of many types of transport media, such as an optical fiber or an Ethernet cable.

Service cards 120 may process incoming packet data prior to transmitting the data to another service card or the network. Service cards 120 may perform route lookups for the data using the forwarding table from controller 110 to determine destination information. If the destination indicates that the data should be sent out on a physical link connected to one of service cards 120, then service card 120 may prepare the data for transmission by, for example, adding any necessary headers and/or modifying existing headers, and transmitting the data from the port associated with the physical link. If the destination indicates that the data should be sent to another service card 120 via switch fabric 130, then service card 120 may prepare the data for transmission to the other service card 120, if necessary, and may send the data to the other service card 120 via switch fabric 130.

Switch fabric 130 may include one or multiple switching planes to facilitate communication among service cards 120 and/or controller 110. In one implementation, each of the switching planes may include a single-stage switch or a multi-stage switch of crossbar elements. Switch fabric 130 may also, or alternatively, include processors, memories, and/or paths that permit communication among service cards 120.

Figure 2:
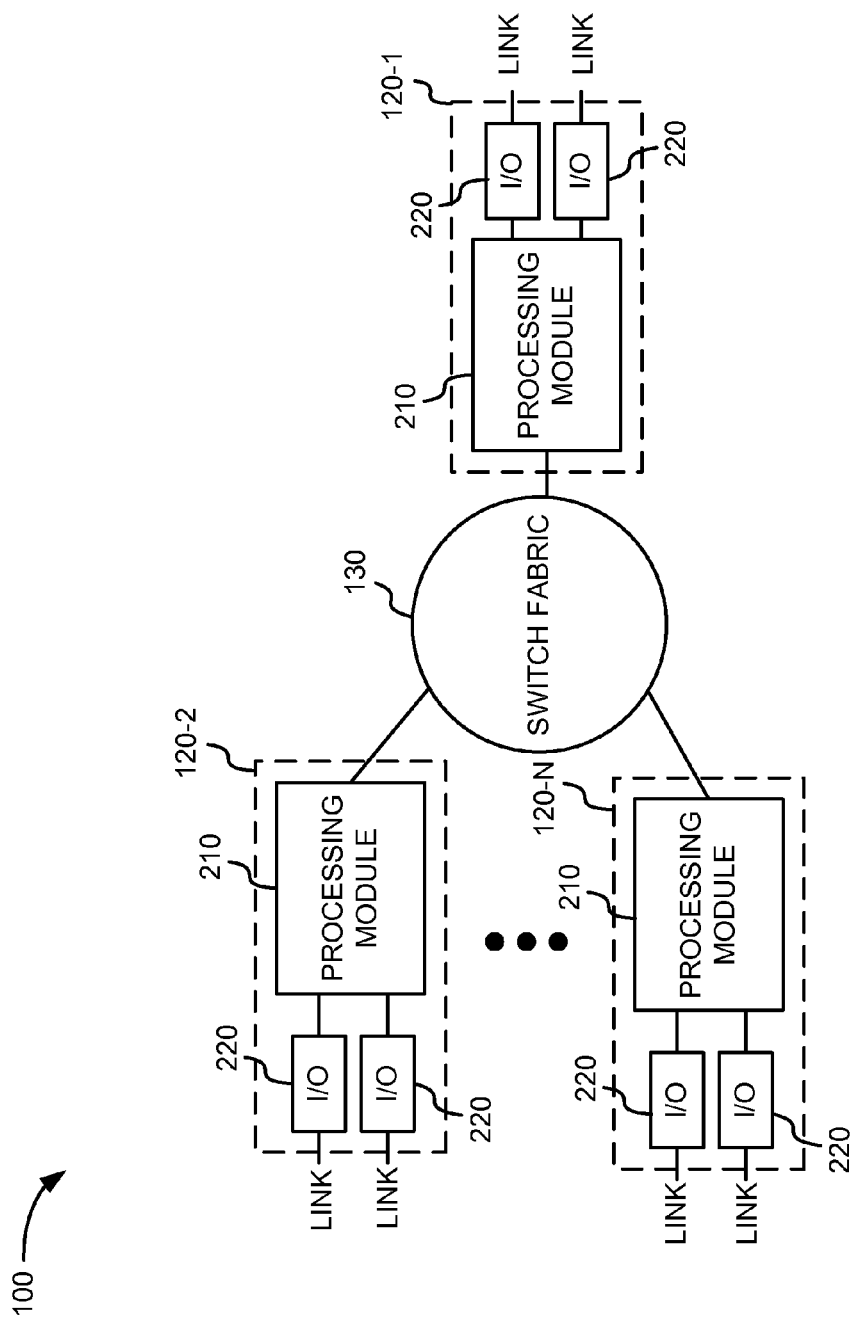
FIG. 2 is a detailed block diagram illustrating portions of the network device shown in FIG. 1.

FIG. 2 is a detailed block diagram illustrating portions of network device 100. As shown, service cards 120 may connect to one another through switch fabric 130. Each of service cards 120 may include one or more processing modules 210 and input/output (I/O) interfaces 220. Although FIG. 2 shows two I/Os 220 connected to each processing module 210 and three processing modules 210 connected to switch fabric 130, in other implementations, there can be more or fewer I/Os 220 and/or processing modules 210.

Each of processing modules 210 may perform packet forwarding functions and handle packet transfers to and from I/Os 220 and switch fabric 130. For example, processing modules 210 may perform routing lookups, classification of packets (e.g., for security purposes), policy-based routing, quality of service (QoS) routing, filtering of packets, and other forms of packet processing (e.g., packet statistical processing, accounting, and/or encapsulation). Processing modules 210 may perform one or more packet processing operations (e.g., packet parsing, route lookup, packet rewriting, nexthop determinations, K-Tree determinations, and/or firewall determinations) based on microinstructions. The microinstructions may be generated by compiling source code for an application or part of an operation system (OS), such as, for example, the Juniper Operating System (JUNOS), the Cisco Internet Operating System (IOS), and the like. Processing modules 210 may execute the microinstructions in one or more processes or threads.

Processing module 210 may generate and process notifications for received packets. The notifications may include a reference to the actual packet data stored in memory and the appropriate outgoing interface (e.g., an outgoing port on one of I/Os 220) associated with the packet. The notifications may be stored in one or more queues corresponding to the outgoing interface. For the sake of simplicity, notifications, referencing packet data, may be referred to herein as packets themselves.

I/Os 220 may transmit data between a physical link and processing module 210. In one implementation, each of I/Os 220 may be a physical interface card (PIC). Different I/Os 220 may be designed to handle different types of network links. For example, one of I/Os 220 may be an interface for an optical link while another of I/Os 220 may be an interface for an Ethernet link, implementing any of a number of well-known protocols.

For incoming data, in one implementation, I/Os 220 may strip off the layer 1 (L1) protocol information and forward the remaining data, such as raw packets, to processing module 210. For outgoing data, I/Os 220 may receive packets from processing module 210, encapsulate the packets in L1 protocol information, and transmit the data on the physical link or "wire."

Although, FIGS. 1 and 2 illustrate example components of network device 100, in other implementations, network device 100 may include additional components, fewer components, different components, or differently arranged components than those illustrated in FIGS. 1 and 2 and described herein. Additionally, or alternatively, one or more operations described as being performed by a particular component of network device 100 may be performed by one or more other components, in addition to or instead of the particular component of network device 100.

Figure 3:
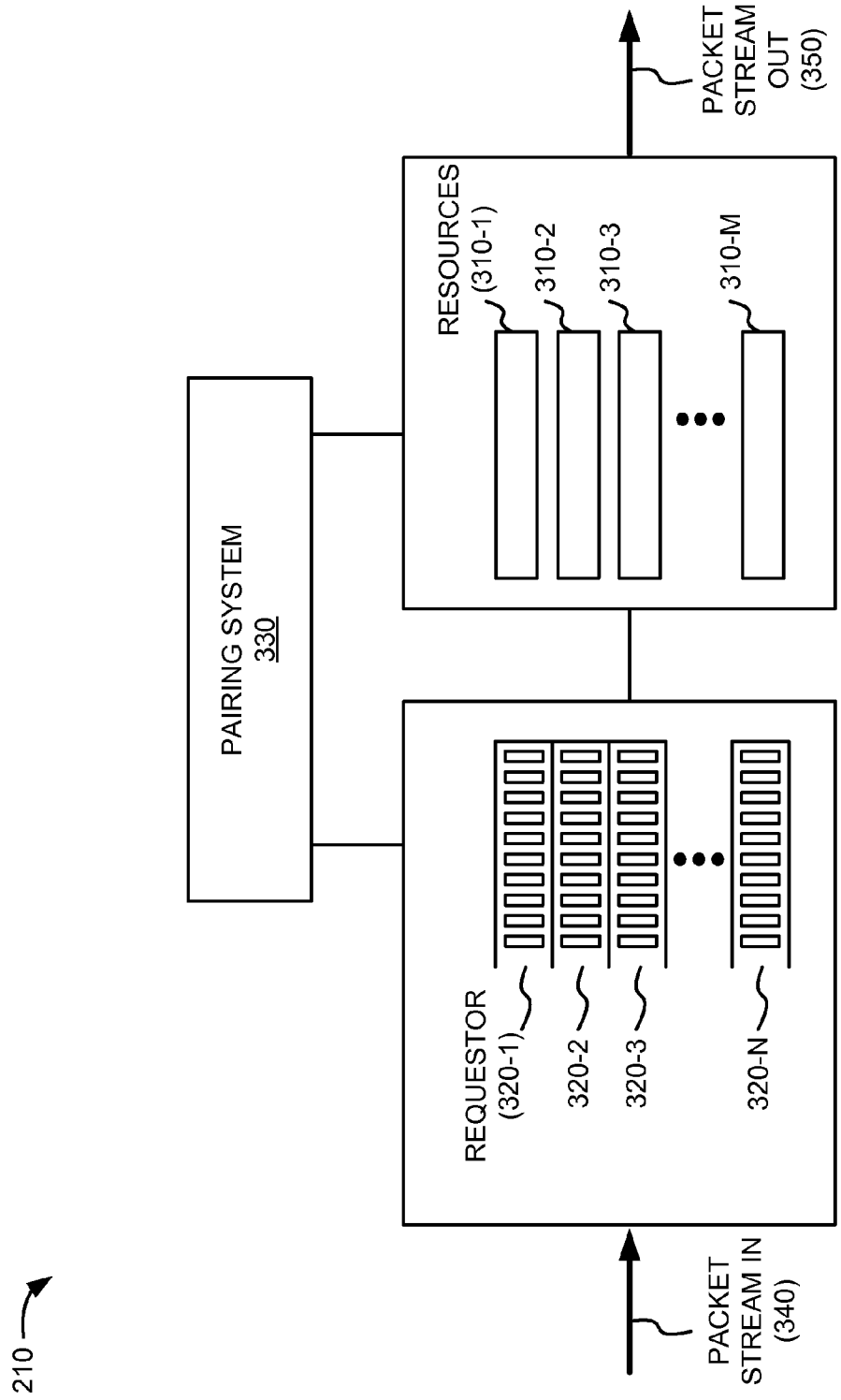
FIG. 3 is a diagram of example functional components of a processing module depicted in FIG. 2.

FIG. 3 is a block diagram showing functional components of processing module 210 according to an implementation described herein. The functional components illustrated in FIG. 3 may be implemented by hardware or a combination of hardware and software. Processing module 210 may include multiple resources 310-1, 310-2, . . . , 310-M (referred to herein collectively as "resources 310" and generically as "resource 310"); multiple requestors 320-1, 320-2, . . . , 320-N (referred to herein collectively as "requestors 320" and generically as "requestor 320"); and a pairing system 330. In one implementation, processing module 210 may be fed by a packet stream 340 and may send out a packet stream 350 after processing.

Resource 310 may include hardware or a combination of hardware and software that may perform or enable performance of packet processing operations, such as processing operations described above in FIG. 2 with respect to processing module 210. Resource 310 may include, for example, a process threads, a hardware component (e.g., a gate, a flop, etc.), a queue, or other resources that may be used to satisfy a request. Resource 310 may be paired with one of requestors 320 to perform or enable performance of packet processing operations relating to that requestor 320. In implementations described herein, resources 310 may be fungible in that any available resource 310 may be paired with any active requestor 320. In one implementation, each resource 310 may provide an indication of availability that allows each of the other resources 310 to calculate a resource priority rank that may be used (e.g., by pairing system 330) in a multiple resource/requestor arbitration. In some implementations, in which priority of availably resources may be relevant, each resource 310 may also obtain (e.g., from pairing system 330) a priority value that may also be used by each resource 310 to calculate its own priority rank position (e.g., that accounts for both the priority value and availability of other resources 310) for a particular clock cycle.

Each of resources 310, that is currently available, may independently calculate its own priority rank position among other resources 310 that are currently available. The priority rank position of resources 310 may be based on how many higher priority resources 310 are available and may not rely on distinctions between the higher priority resources 310. That is, the priority rank position calculation by each resource 310 may involve how many higher ranked resources 310 are present, not which ones.

For example, assuming priority values are assigned to resources 310, each resource 310 may determine how many other resources 310, with a higher priority, are available for pairing with a requestor 320. For cases where one of resources 310 has top priority, the calculation can be trivial (e.g., 0). Similarly, when one of resource 310 has the second priority, the calculation can also be trivial (e.g., only a single resource 310 may be consulted). For cases where one of the resources 310 is at a lower (e.g., third, fourth, etc.) priority level, information from other resources 310 may be used to calculate availabilities. For example, a series of dedicated 1-bit adders may be used by the resources 310 to determine how many other resources 310 with higher priority are currently available for pairing. Thus, when one of resources 310 is in the Nth position, adders of the other N−1 resources 310 may be added together to determine how many of them are available. These resource adders may not be shared, but rather an adder may exist for each possible selection of resources 310. While adders provide one mechanism for tracking and calculating resource 310 availability, in other implementations a different mechanism may be used.

Once the availability of each higher priority resource 310 is determined, the priority rank position for each resource 310 may be determined using logical expressions. For instance, if one of resource 310 (e.g., resource 310-1) is the top priority, that resource 310 may automatically assume the first priority rank position (if resource 310-1 is available). For one of resources 310 to be in the second priority rank position, there must be exactly one available higher priority resource 310. For one of resources 310 to be in the third priority rank position, exactly two higher priority resources 310 can be active. The calculation of each priority rank position may be performed by each resource 310 in parallel, similar to calculations by each requestor 320 described below.

Requestor 320 may include hardware or a combination of hardware and software that may supply work to be processed by resources 310. In one implementation, requestor 320 may include a memory component, such a queue or buffer, or a processor that provides packets, portions of packets, packet identifiers, and/or notifications upon which processing may be performed by an available resource 310. In implementations described herein, each requestor 320 may provide an indication of activity (e.g., available work) and may receive (e.g., from pairing system 330) a priority ranking that, together, may allow each of the other requestors 320 to calculate a requestor priority rank position that may be used (e.g., by pairing system 330) in a multiple resource/requestor arbitration. In some implementations, each requestor 320 may also obtain (e.g., from pairing system 330) a priority value that may also be used by each requestor 320 to calculate its own priority rank position (e.g., that accounts for both the priority value and activity of other requestor 320) for a particular clock cycle.

Each of requestors 320 may independently calculate its own priority rank position among other requestors 320 that are currently active. The priority rank position of requestors 320 may be based on how many higher priority requestors 320 are active and may not rely on distinctions between the higher priority requestors 320. That is, the priority rank position calculation by each requestor 320 may involve how many higher ranked requestors 320 are present, not which ones.

For example, each requestor 320 may determine how many other requestors 320, with a higher priority, desire a resource 310. For the cases where one of requestors 320 has top priority, the calculation can be trivial (e.g., there would be 0 other requestors 320). Also, when one of requestors 320 is the second priority, the calculation can also be trivial (e.g., only a single requestor 320 may be consulted). For cases when one of the requestors 320 is at a lower (e.g., third, fourth, etc.) priority level, information from other requestors 320 may be used to calculate how many other requestors desire a resource 310. For example, a series of dedicated 1-bit adders may be used by the requestor 320 to determine how many other requestors 320 with higher priority are currently requesting resource 310. Thus, when one of requestors 320 is in the Nth position, adders of the other N−1 requestors may be added together to determine how many of them are active. These adders may not be shared, but rather an adder may exist for each possible selection of requestors 320. While adders provide one mechanism for tracking and calculating requestor 320 activity, in other implementations a different mechanism may be used.

Once the availability of each higher priority requestor 320 is determined, the priority rank position for each requestor 320 may be determined using logical expressions. For instance, if one of requestor 320 (e.g., requestor 320-1) is the top priority, that requestor 320 may automatically assume the first priority rank position (if requestor 320-1 has work available). For one of requestors 320 to be in the second priority rank position, there must be exactly one available higher priority requestor 320. For one of requestors 320 to be in the third priority rank position, exactly two higher priority requestors 320 can be active. The calculation of each priority rank position may be performed by each requestor 320 in parallel, similar to the calculations by each requestor 320 described above. Also, the resource priority rank position calculations and the requestor priority rank position calculations may be performed in parallel.

Pairing system 330 may include a hardware component, such as an application specific integrated circuits (ASICs), field programming gate arrays (FPGAs), or other processing components, or a combination of hardware and software, that manages the simultaneous pairing of multiple available resources 310 with multiple active requestors 320. In one implementation, pairing system 330 may provide a separate priority schedule for both resources 310 and requestors 320. Pairing system 330 may also receive an availability indication from one or more resources 310 and an activity indication form one or more requestors 320. The priority schedules, the availability indications, and the activity indications may be updated after each clock cycle. If requestors 320 are available for resources 310, pairing system 330 may perform an arbitration (e.g., based on the individual priority ranks from resources 310 and requestors 320) to match multiple resource 310/requestor 320 pairings. Pairing system 330 is discussed further in connection with, for example, FIG. 4.

Although, FIG. 3 illustrates example components of processing module 210, in other implementations, processing module 210 may include additional components, fewer components, different components, or differently arranged components than those illustrated in FIG. 3 and described herein. Additionally, or alternatively, one or more operations described as being performed by a particular component of processing module 210 may be performed by one or more other components, in addition to or instead of the particular component of processing module 210.

Figure 4:
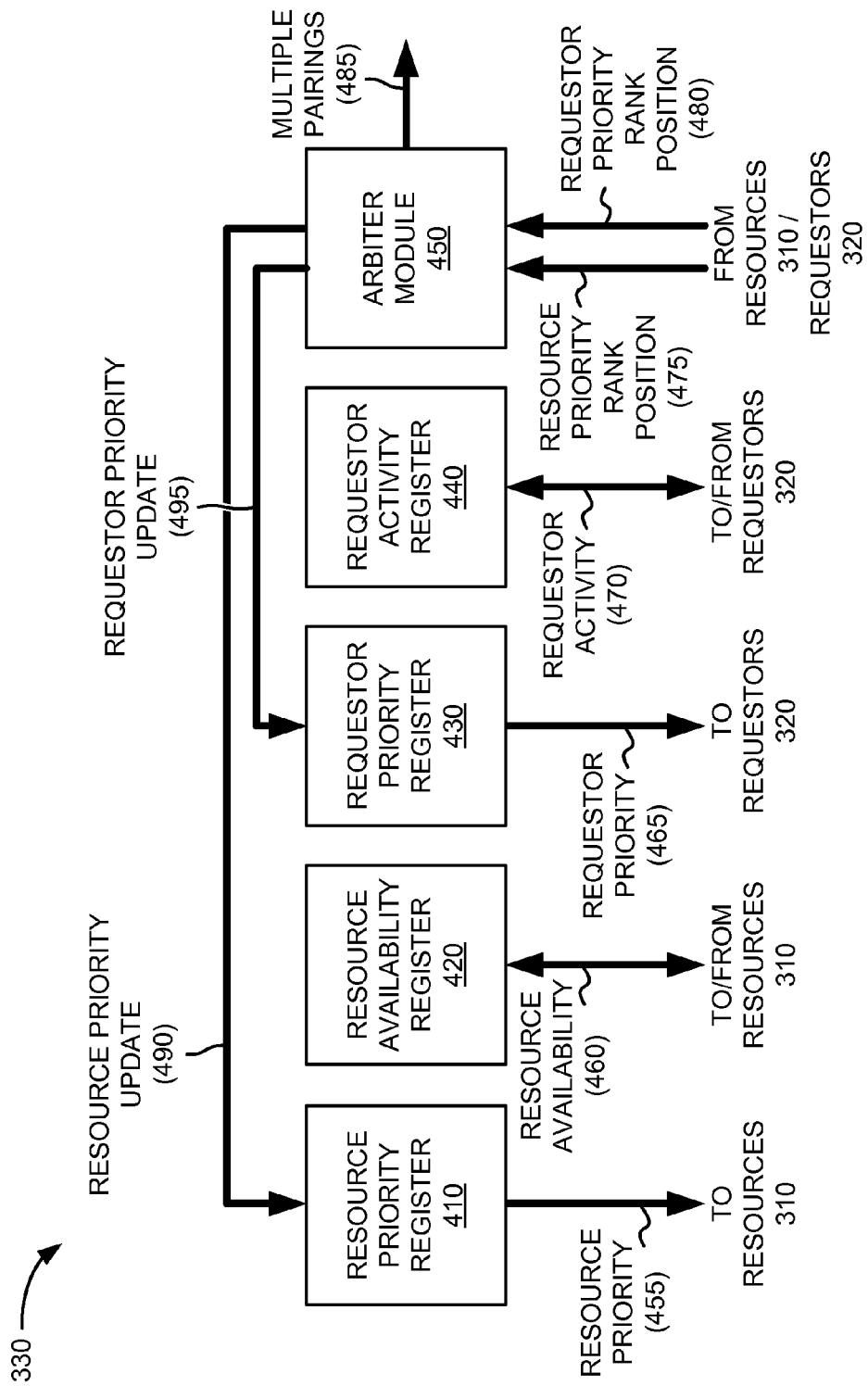
FIG. 4 is a diagram of example interactions between functional components in the pairing system depicted in FIG. 3.

FIG. 4 is a diagram of interactions among example functional components of pairing system 330. The functional components illustrated in FIG. 4 may be implemented by hardware or a combination of hardware and software. Pairing system 330 may include resource priority register 410, a resource availability register 420, a requestor priority register 430, a requestor activity register 440, and an arbiter module 450. In one implementation, resource priority register 410, resource availability register 420, requestor priority register 430, requestor activity register 440, and arbiter module 450 may perform operations based on a time-division multiplexing (TDM) schedule.

Resource priority register 410 may perform priority scheduling for resources 310. In one implementation, resource priority register 410 may use a round-robin sequence, updated at each clock cycle, to assign priorities to resources 310. Priorities may be applied to resources 310, for example, to ensure even distribution of resource use.

Resource availability register 420 may track states of resources 310 (e.g., as available or unavailable). In one implementation, resource availability register 420 may rely on information from each of resources 310 to flag when each resource 310 is available for pairing.

Requestor priority register 430 may perform priority scheduling for requestors 320. In one implementation, requestor priority register 430 may use a round-robin sequence to assign priorities to resources 310. Priorities may be applied to requestors 320, for example, to fair distribution of requestors 320 to resources 310.

Requestor activity register 440 may track states of requestors 320 (e.g., as needing resources or empty). In one implementation, requestor activity register 440 may rely on information from each of requestors 320 to flag when each requestor 320 is available for pairing. In one implementation, requestor activity register 440 may include a series of dedicated 1-bit adders to allow each requestor 320 to determine how many other requestors 320 with higher priority are currently requesting one of resources 310. These adders are not shared, but rather an adder may be used for each possible selection of requestors 320.

Arbiter module 450 may match waiting work from requestors 320 with available resources 310 using, for example, an arbitration process. In one implementation, arbiter module 450 may match each of the resource priority ranks with a corresponding requestor priority rank. If there are more requestors 320 than resources 310, then the unpaired requestors 320 may be discarded. Once the number of pairings has been determined, both the requestor and resource priority levels (e.g., of resource priority register 410 and requestor priority register 430, respectively) may be advanced according to the number of valid pairs (e.g., if two pairings are valid, both resource priority register 410 and requestor priority register 430 may advance priority levels two).

In operation, resource priority counter 410 may provide a resource priority value 455 to each resource 310. Resource availability register 420 may receive resource availability indications 460 from individual resources 310 and may provide resource availability indications 460 (e.g., of the other resources 310) to each resource 310. Each available resource 310 may apply resource priority value 455 and resource availability indications 460 to calculate a resource priority rank position 475.

Requestor priority register 430 may provide a requestor activity indicator 470 to each requestor 320. Requestor activity register 440 may receive requestor activity indications 470 from individual requestors 320 and may provide requestor activity indications 470 (e.g., of the other requestors 320) to each requestor 320. Each available requestor 320 may apply requestor priority value 465 and requestor activity indications 470 to calculate a resource priority rank position 480.

Arbiter module 450 may receive a resource priority rank position 475 from each resource 310 and a requestor priority rank position 480 from each requestor 320. To perform a multi-arbitration, arbiter module 450 may pair the resource priority rank positions 475 and the requestor priority rank positions 480. If there are more requestors than resources, the unpaired requestor priority rank positions 480 may be discarded. The results of the multi-arbitration may be provided as multiple pairings 485. Multiple pairings 485 may be provided to, for example, resources 310, requestors 320, and/or a scheduling component to assign work from a paired requestor 320 to a paired resource 310.

Once the number of pairings has been determined, arbiter module 450 may provide a resource priority update message 490 to update the resource priority levels in resource priority register 410 and a requestor priority update message 495 to update the requestor priority levels in requestor priority register 430. For example, the resource priority levels in resource priority register 410 and the requestor priority levels in requestor priority register 430 may be advanced according to the number of valid pairs (e.g., if two pairings are valid, both the resource priority levels in resource priority register 410 and the requestor priority levels in requestor priority register 410 may be advanced by two). Thus, systems and/or methods described herein do not require the number of resources 310 and requestors 320 to be equal.

Although, FIG. 4 illustrates example functional components of pairing system 330, in other implementations, pairing system 330 may include additional functional components, fewer functional components, different functional components, or differently arranged functional components than those illustrated in FIG. 4 and described herein. Additionally, or alternatively, one or more operations described as being performed by a particular functional component of pairing system 330 may be performed by one or more other functional components, in addition to or instead of the particular functional component of pairing system 330.

Figure 5:
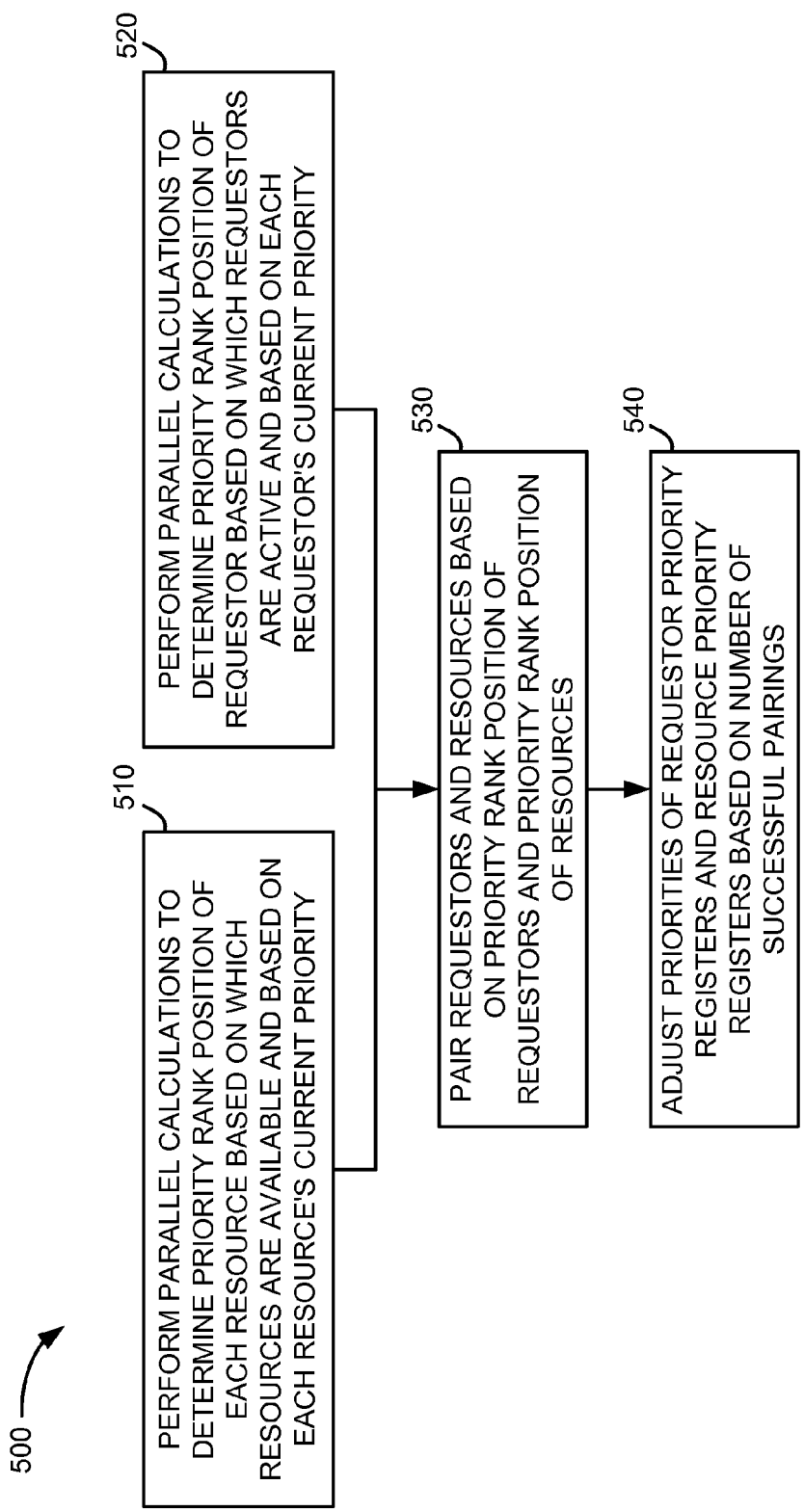
FIGS. 5-7 are flow charts of an example process for performing a multiple resource/requestor arbitration according to an implementation described herein.
Figure 6:
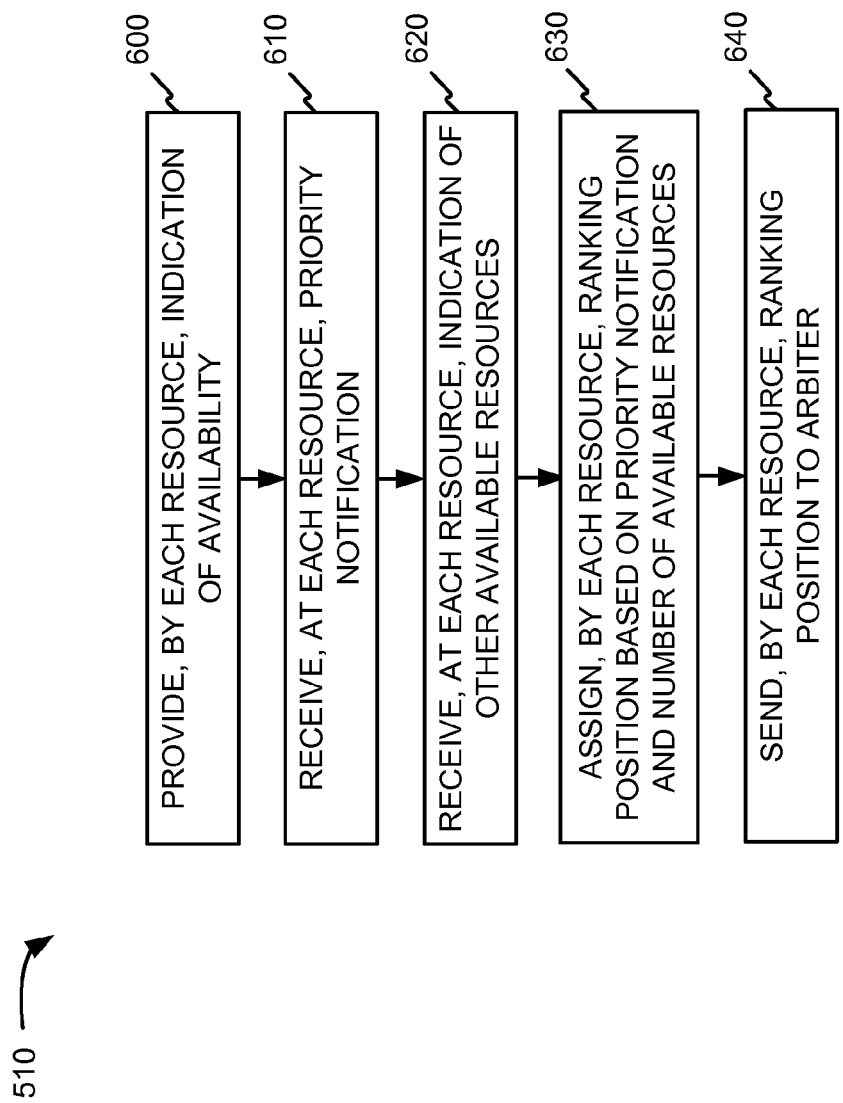
Figure 7:
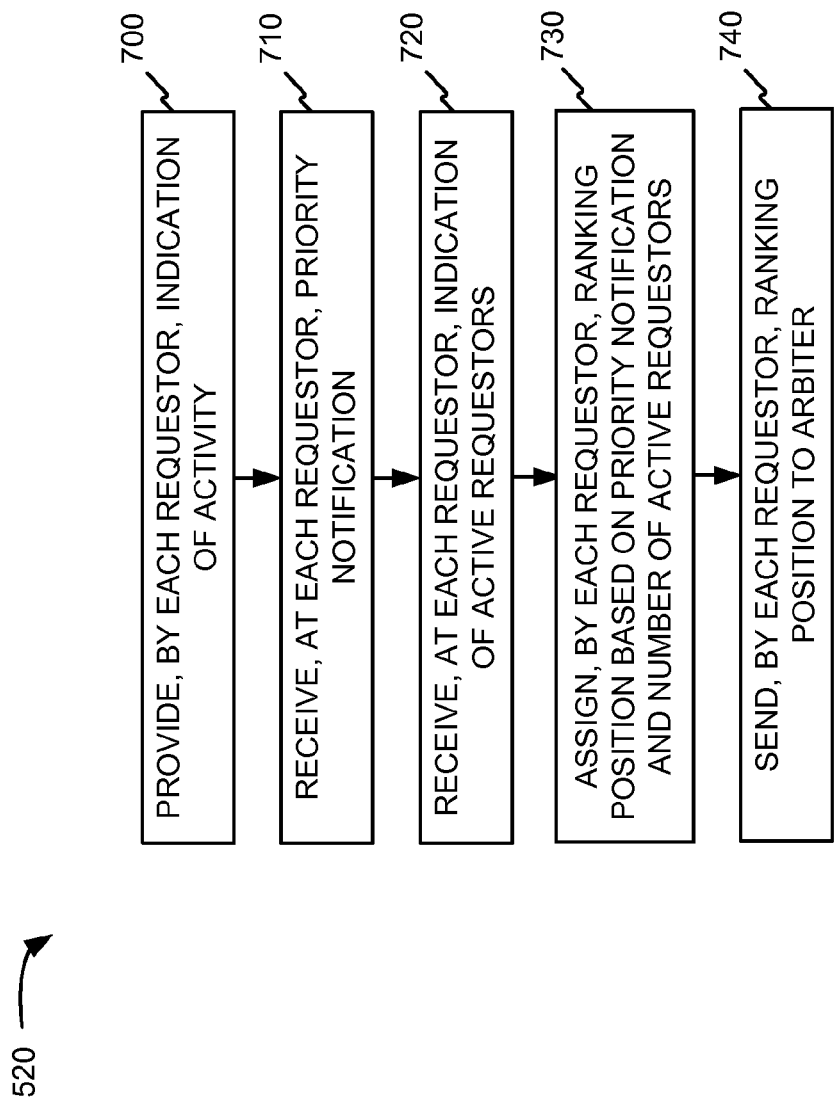

FIGS. 5-7 are flow charts of an example process 500 for performing a multiple resource/multiple requestor arbitration according to an implementation described herein. In one implementation, process 500 may be performed by processing module 210. In another implementation, some or all of process 500 may be performed by another component or group of components, including or excluding processing module 210.

As shown in FIG. 5, process 500 may include performing parallel calculations to determine a priority rank position of each resource based on which resources are available and based on each resource's current priority (block 510) and performing parallel calculations to determine priority rank position of each requestor based on which requestors are active and based on each requestor's current priority (block 520). For example, each of resources 310, that is currently available, may independently calculate its own priority rank position among other resources 310 that are currently available. The priority rank position of resources 310 may be based on how many higher priority resources 310 are available and may not rely on distinctions between the higher priority resources 310. The priority rank position for each of resources 310 may be provided as resource priority rank positions 475. Similarly, each of requestors 320 may independently calculate its own priority rank position among other requestors 320 that are currently active. The priority rank position of requestors 320 may be based on how many higher priority requestors 320 are active and may not rely on distinctions between the higher priority requestors 320. The priority rank position for each of requestors 320 may be provided as requestor priority rank positions 480.

Process 500 may further include pairing requestors and resources based on the priority rank position of the requestors and the priority rank position of the resources (block 530). For example, as described above in connection with FIG. 4, arbiter module 450 may receive a resource priority rank position 475 from each resource 310 and a requestor priority rank position 480 from each requestor 320. To perform a multi-arbitration, arbiter module 450 may pair the resource priority rank positions 475 and the requestor priority rank positions 480. If there are more requestors than resources, the unpaired requestor priority rank positions 480 may be discarded. The results of the multi-arbitration may be provided as multiple pairings 485. Multiple pairings 485 may be provided to, for example, resources 310, requestors 320, and/or a scheduling component.

Process 500 may further include adjusting the priorities of the requestor priority registers and the resource priority registers based on the number of successful pairing (block 540). For example, as described above in connection with FIG. 4, once the number of pairings has been determined, arbiter module 450 may provide a resource priority update message 490 to update the resource priority levels in resource priority register 410 and a requestor priority update message 495 to update the requestor priority levels in requestor priority register 430.

Process block 510 may include the process blocks depicted in FIG. 6. As shown in FIG. 6, process block 510 may include providing, by each resource, an indication of availability (block 600); receiving, at each resource, a priority notification (block 610); receiving, at each resource, an indication of other available resources (block 620); assigning, by each resource, a ranking position based on the priority notification and the indication of available resources (block 630); and sending, by each resource, the ranking position to an arbiter (block 640). For example, each resource 310 may provide an indication of availability that maybe accumulated (e.g., by resource availability register 420). Each resource 310 may receive (e.g., from resource priority register 410) a resource priority value (e.g., resource priority value 455). In some implementations, each resource 310 may also obtain (e.g., from resource availability register 420) an availability indication value that may also be used by each resource 310 to calculate its own priority rank position (e.g., that accounts for both the priority value and availability of other resources 310) for a particular clock cycle. The priority rank position may be provided to arbiter module 450 as resource priority rank position 475.

Process block 520 may include the process blocks depicted in FIG. 7. As shown in FIG. 7, process block 520 may include providing, by each requestor, an indication of activity (block 700); receiving, at each requestor, a priority notification (block 710); receive, at each requestor, an indication of active requestors (block 720); assigning, by each requestor, a ranking position based on priority notification and number of active requestors (block 730); and sending, by each requestor, the ranking position to an arbiter (block 740). For example, each requestor 320 may provide an indication of activity that may be accumulated (e.g., by requestor activity register 440). Each requestor 320 may receive (e.g., from requestor priority register 430) a requestor priority value (e.g., requestor priority value 465). Each requestor 320 may also obtain (e.g., from requestor availability register 440) an activity indication that may also be used by each requestor 320 to calculate its own priority rank position (e.g., that accounts for both the priority value and availability of other requestors 320) for a particular clock cycle. The priority rank position may be provided to arbiter module 450 as requestor priority rank position 480.

Systems and/or methods described herein allow for the concurrent pair of multiple resources with multiple requestors. The systems and/or methods described herein allow for performance of multiple arbitrations in parallel during a single clock cycle. Given short cycle times, the systems and/or methods allows for multiple requestor/resource pairings, using a fully round-robin scheme, without the long latency of having to do sequential arbitrations.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a network device including a group of resources and a group of requestors of the resources, the method comprising:
   determining, by the network device and for each available resource of the group of resources, a priority rank position of each resource, among the available resources, based on which other resources are available and based on a priority of each available resource, where determining the priority rank position of each available resource includes:
      providing, by each available resource and to a resource availability register, an indication of availability,
      receiving, at each available resource, an indication of a number of each of the other available resources, and
      assigning, to each available resource and by each available resource, the priority rank position of each resource, based on the number of each of the other available resources;
   determining, by the network device and for each active requestor of the group of requestors, a priority rank position of each requestor, among the active requestors, based on which other requestors are active and based on a priority of each active requestor;
   assigning, by the network device, one or more pairs of the available resources and the active requestors based on the priority rank position of the active resources and the priority rank position of the active requestors; and
   assigning, by the network device, work to the available resources based on the one or more pairs.

2. The method of claim 1, further comprising:
   adjusting priorities of a requestor priority register based on a quantity of the one or more pairs.

3. The method of claim 1, where determining the priority rank position of each available resource and determining the priority rank position of each active requestor are performed in parallel.

4. The method of claim 1, where determining the priority rank position of each available resource further comprises:
   receiving, by each available resource, a resource priority notification, and where assigning the priority rank position of each available resource is further based on the resource priority information.

5. The method of claim 1, where determining the priority rank position of each active requestor further comprises:
   providing, by each active requestor and to a requestor activity register, an indication of requestor activity,
   receiving, by each active requestor, a requestor priority notification,
   receiving, at each active requestor, an indication of a quantity of each of the other active requestors, and
   assigning, to each active requestor and by each active requestor, the priority rank position of each requestor, based on the priority notification and the quantity of each of the other active requestors.

6. The method of claim 1, where the assigning the one or more pairs of the available resources and the active requestors is performed within a single cycle.

7. The method of claim 1, where the group of resources and the group of requestors of the resources are included on a single application-specific integrated circuit (ASIC).

8. A device comprising:
   a group of resources, where each resource is to determine a priority rank position, among the group of resources, based on which other resources of the group of resources are available;
   a group of requestors of the resources, where each requestor is to:
      receive a requestor priority notification,
      receive an indication of a quantity of higher priority requestors from the group of requestors, and
      determine a priority rank position, for each requestor in the group of requestors, based on the priority notification and the indication of the quantity of the higher priority requestors; and
   a processing component to:
      receive the priority rank position of each resource of the group of resources and the priority rank position of each requestor of the group of requestors,
      assign pairs of the resources and the requestors based on the priority rank position of each resource and the priority rank position of each requestor, and
      assign work to resources of the group of resources based on the assigned pairs.

9. The device of claim 8, where the processing component is further to:
   assign priorities to each resource of the group of resources, and
   adjust the priorities of the resources based on a quantity of the one or more pairs.

10. The device of claim 8, where the priority rank position, among the group of resources, and the priority rank position, among the group of requestors, are determined simultaneously.

11. The device of claim 8, where each resource is further to:
    provide, to the processing component, an indication of availability, and
    receive an indication of other available resources, from the group of resources, that have a higher priority.

12. The device of claim 8, where the priority rank position, among the group of resources, and the priority rank position, among the group of requestors, are determined within a single clock cycle.

13. The device of claim 8, where the group of resources, the group of requestors of the resources, and the processing component are included on a single application-specific integrated circuit (ASIC).

14. The device of claim 8, where the device comprises one or more of:
- a router,
- a switch,
- a gateway,
- a firewall,
- a network interface card (NIC),
- a hub,
- a bridge,
- a proxy server, or
- an optical add-drop multiplexer (OADM).

15. A method performed by a network device, the method comprising:
- receiving, by the network device, a resource priority indication for a resource of a group of processing resources;
- receiving, by the network device, an availability indication of other available resources, in the group of processing resources, that have a higher priority than that of the resource priority indication;
- determining, by the network device, a priority rank position for the resource, among the other available resources, based on the resource priority indication and the availability indication;
- receiving, by the network device, a requestor priority indication for a requestor of a group of requestors for the processing resources;
- receiving, by the network device, an activity indication of other requestors, in the group of requestors, that have a higher requestor priority;
- determining, by the network device, a priority rank position for the requestor, among the other requestors, based on the requestor priority indication and the activity indication; and
- assigning, by the network device, the resource and the requestor to a pairing, based on the priority rank position for the resource and the priority rank position for the requestor.

16. The method of claim 15, where determining the priority rank position for the resource and determining the priority rank position for the requestor are performed in parallel.

17. The method of claim 15, further comprising:
- adjusting the resource priority indication and the requestor priority indication based on assigning the resource and the requestor to the pairing.

18. The method of claim 15, where determining the priority rank position for the resource, determining the priority rank position for the requestor, assigning the resource and the requestor to the pairing are performed in a single clock cycle.

\* \* \* \* \*